United States Patent [19]

Ahmed et al.

[11] Patent Number: 4,822,552

[45] Date of Patent: Apr. 18, 1989

[54] METHOD AND APPARATUS FOR PASSIVELY GAMMA SCANNING A NUCLEAR FUEL ROD

[75] Inventors: Hassan J. Ahmed; James L. Fogg, both of Columbia, S.C.

[73] Assignee: Westinghouse Electric Corp., Pittsburgh, Pa.

[21] Appl. No.: 18,900

[22] Filed: Feb. 25, 1987

[51] Int. Cl.⁴ .................................................. G21C 17/06
[52] U.S. Cl. .................................................. 376/257
[58] Field of Search .................................................. 376/257

[56] References Cited

U.S. PATENT DOCUMENTS

| | | | |
|---|---|---|---|
| 3,299,268 | 1/1967 | Haruo Muto et al. | 250/83.1 |
| 3,636,353 | 1/1972 | Untermyer | 250/83.1 |
| 3,717,765 | 2/1973 | Hiller . | |
| 3,728,544 | 4/1973 | Untermyer | 250/83.1 |
| 3,755,675 | 8/1973 | Stephan et al. | 250/391 |
| 3,767,919 | 10/1973 | Michaelis | 250/83.1 |
| 3,786,256 | 1/1974 | Untermyer . | |
| 3,794,843 | 2/1974 | Chen | 250/359 |
| 3,825,753 | 7/1974 | Givens | 250/265 |
| 4,024,017 | 5/1977 | Fleck . | |
| 4,158,769 | 6/1979 | Smith | 250/255 |
| 4,229,654 | 10/1980 | Arya et al. . | |
| 4,277,680 | 7/1981 | Rodriguez | 250/358 R |
| 4,278,885 | 7/1981 | Von Alfthan et al. | 250/370 |
| 4,284,893 | 8/1981 | Allan et al. | 250/390 |
| 4,291,227 | 9/1981 | Caldwell et al. . | |
| 4,389,568 | 6/1983 | Dowdy et al. | 250/362 |
| 4,522,276 | 6/1985 | Fogg et al. | 177/145 |
| 4,554,128 | 11/1985 | Parker et al. | 376/252 |
| 4,573,847 | 3/1986 | Howell et al. | 414/63 |
| 4,587,407 | 5/1986 | Ahmed et al. | 235/467 |
| 4,589,082 | 5/1986 | Parker et al. | 364/561 |
| 4,629,600 | 12/1986 | Ishiguro et al. | 376/257 |
| 4,647,420 | 3/1987 | Bramblett et al. | 376/257 |

FOREIGN PATENT DOCUMENTS

| | | |
|---|---|---|
| 249813 | 10/1966 | Austria . |
| 1648901 | 8/1967 | Fed. Rep. of Germany . |
| 2926051 | 2/1980 | Fed. Rep. of Germany . |

Primary Examiner—Charles T. Jordan
Assistant Examiner—Richard W. Wendtland

[57] ABSTRACT

A method and apparatus for passively scanning for the gamma radiation emission count of nuclear fuel contained within a nuclear fuel rod to determine enrichment uniformity are enclosed, and wherein a nuclear fuel rod containing a nuclear fuel is advanced along a linear path of travel and its natural gamma radiation emission count is repeatedly detected at each of a plurality of regularly spaced apart discrete segments along the length of the rod. The outputs from each of the detecting steps are summed to obtain a total gamma radiation count for each segment from which the enrichment values for each segment as well as the average enrichment of said fuel rod may be calculated.

12 Claims, 11 Drawing Sheets

METHOD AND APPARATUS FOR PASSIVELY GAMMA SCANNING A NUCLEAR FUEL ROD

BACKGROUND OF THE INVENTION

This invention relates to passively scanning the gamma radiation emission count of a nuclear fuel contained within a fuel rod to determine enrichment levels and uniformity throughout the fuel rod.

Nuclear energy has become an important source and supply of energy for many countries throughout the world. The nuclear fuel elements used in the generation of energy usually are composed of a multiplicity of nuclear fuel rods encased within a central reactor core. The nuclear fuels used are typically composed of small pellets of uranium or some other fissionable isotope such as plutonium encased within a long tubular housing commonly known as the fuel rod. Even though a number of pellets are contained within each fuel rod, each pellet must have a proper percentage of fissionable isotope (enrichment) as compared with other pellets.

Natural uranium has an enrichment factor of approximately 0.71% which corresponds to the percentage of the highly fissionable uranium-235 ($U^{235}$) isotope. After processing to enrich the $U^{235}$ isotope content, the uranium content typically has a $U^{235}$ enrichment factor ranging from three to five percent and is commonly a uranium dioxide ($UO_2$) powder derived from gaseous uranium hexaflouride ($UF_6$). The powder is pelletized for placement within the fuel rods and the fuel rods scanned to assure that all pellets are of a uniform enrichment. The scanning operation is important since a non-homogenous fuel rod having varying enrichments throughout or a deviant average enrichment varying from an established norm could create severe variations in fuel burn-up or heating while a reactor is in operation.

Two methods have been previously employed to scan a nuclear fuel contained within a fuel rod for variations in enrichment along the rod (i.e., enrichment uniformity); either a passive or an active system has been used. A passive system detects the natural radiation of the nuclear fuel while an active system induces an additional radiation in the nuclear fuel above that amount irradiated naturally and detects that additional radioactivity. Of these two systems, the most efficient and commonly used method previously employed has been the active system. In an active system, a primary radiation consisting of neutrons from a source such as Californium-252 bombards the nuclear fuel within a fuel rod inducing a secondary radiation of gamma emissions and prompt or delayed fast neutrons. This secondary radiation is then counted to determine fuel content and enrichment.

Even though these active systems have proven feasible in the past for scanning ordinary fuel rods containing nuclear fuels, difficulties often arise when scanning recently manufactured nuclear fuels. Manufacturers have begun to add thermal neutron absorbing materials (burnable poisons) to the nuclear fuels encased within a fuel rod which makes scanning such a rod by the common active system impracticable since an ambiguity exists between the primary radiation absorption of the burnable poison and the effects of the fuel enrichment. These burnable poisons such as Gadolinium, Europium and Boron are added to the nuclear fuel to reduce reactivity variations during the fuel burn-up in nuclear reactors. The loss of reactivity through the depletion of the nuclear fuel is partially compensated through the destruction of the burnable poison by neutron absorption during reactor operation.

Since the more commonly used active system is limited in its accuracy by the burnable poison content within a nuclear fuel, a passive system is the other alternative which can be used for scanning a nuclear fuel having with it associated burnable poisons. A passive system detects the radiation caused by the natural decay of the nuclear fuel. For example, the 185 KeV (thousand electron volts) gamma radiation emitted by $U^{235}$ may be detected in order to determine the enrichment factor of a nuclear fuel using $U^{235}$ as the fissionable isotope. The amount of burnable poison associated with the nuclear fuel has no bearing upon the natural gamma radiation emitted by the fuel. Unfortunately, prior attempts to use passive systems for determining enrichment values have been limited since a gamma radiation detector or scintillator of the type commonly used is not able to reliably detect the very low natural irradiations which are associated with conventional fuel rods, and thus the error rate was relatively high. Not only were the prior passive systems limited by this relatively high error rate, but other limitations hindered the passive system such as interference from other gamma radiation energies. Many detectors have an unacceptable poor resolution making the differentiation between the various spectral energy lines difficult. For example, in a nuclear fuel with a high $U^{238}$ content, the higher energy gamma radiation from the $U^{238}$ daughter, Protactinium-234 is great enough to interfere with the resolution of a detector.

Therefore, it is an object of the present invention to provide a method of and an apparatus for passively scanning the gamma radiation emission count of a nuclear fuel contained within a fuel rod to determine enrichment uniformity, and which overcomes the above-noted limitations of the prior passive systems.

It is a further object of the present invention to provide a method of and apparatus for passively scanning the gamma radiation emission count of a nuclear fuel contained within a fuel rod to determine enrichment uniformity, and which are fully automatic.

SUMMARY OF THE INVENTION

In accordance with the present invention, there are provided a method of and apparatus for passively scanning the gamma radiation emission count of nuclear fuel contained within a fuel rod to determine enrichment uniformity. More particularly, a fuel rod is advanced along a linear path of travel, and the natural gamma radiation emission count at each of a plurality of regularly spaced apart discrete segments along the length of the rod is repeatedly detected at a predetermined energy level as the fuel rod advances along its linear path of travel. The outputs for each of the detecting steps from each segment are summed to obtain a total gamma radiation count for each segment and from the total count obtained from each segment, the enrichment value for each segment and the average enrichment value for the fuel rod may be calculated. In accordance with the present invention, the possibility of error is minimized, since the error potential decreases for each detector added, and the error potential of the system is inversely proportional to the total number of counts obtained. Each fuel rod is also preferably monitored to detect deviations from a specific enrichment value and- /or for deviations in the enrichment values of adjacent segments of said fuel rod greater than a predetermined percentage.

During operation, fuel rods are stored on a feed table. From the feed table, the fuel rods are sequentially transferred onto a rod advancing means and advanced while its gamma radiation emissions are counted. After scanning, the fuel rods are transferred onto an unloading table from the rod advancing means.

BRIEF DESCRIPTION OF THE DRAWINGS

Some of the objects and advantages of the present invention having been stated, others will be more fully understood by reference to the following drawings in which.

DETAILED DESCRIPTION OF THE PREFERRED EMBODIMENTS

Figure 1:
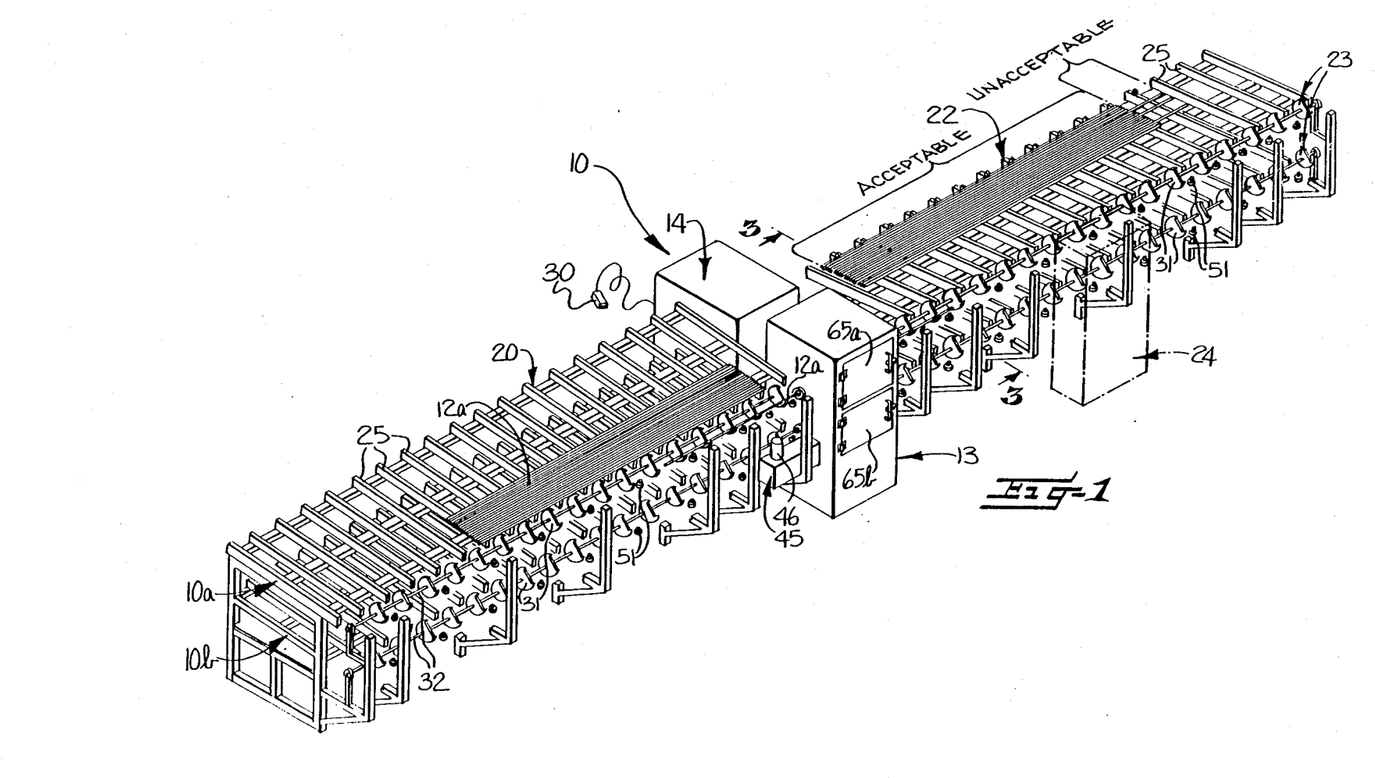
FIG. 1 is a perspective view of a preferred embodiment of the apparatus of the present invention, and which includes two parallel and substantially duplicate components.

Referring now to the drawings, there is shown in FIG. 1 an apparatus designated generally at 10 for passively scanning the gamma radiation emission count of a nuclear fuel so as to determine its enrichment uniformity. The apparatus 10 comprises an upper system 10a, and a substantially identical lower system 10b, for permitting a pair of fuel rods 12a and 12b to be scanned at one time. The apparatus 10 includes means for advancing a pair of fuel rods 12a and 12b along a linear path of travel and means 13 positioned along the path of travel for repeatedly scanning and detecting in shifted timed intervals the 185 KeV natural gamma radiation emission count at each of a plurality of regularly spaced apart discrete segments along the length of the fuel rods 12a and 12b as the fuel rods 12a and 12b are advanced. The apparatus 10 further includes control means 14 which is essentially counting electronics and a computer for recording and summing the gamma radiation emission count obtained in shifted timed intervals for each segment of the fuel rods 12a and 12b and from that total count obtained in each segment calculating the enrichment values for each segment, and the average enrichment of the fuel rods 12a and 12b. Based upon these values, a fuel rod 12a or 12b will be acceptable or unacceptable for its intended end use. Each fuel rod 12a and 12b is approximately twelve feet long and one-half inch in diameter and contains a plurality of one-half inch long Boron coated ($ZrBr_2$) uranium dioxide ($UO_2$) pellets.

Included with the apparatus are a feed table 20 for storing fuel rods 12a prior to scanning, rod advancing means 21 for advancing a fuel rod 12a along a linear path of travel and through the detecting means 13, and an unloading table 22 for storing the fuel rods 12a after they have been scanned. The detecting means 13 is positioned between the feed table 20 and the unloading table 22. A rod transferring means 23 assures the stable transfer of a fuel rod 12a from the feed table 20 onto the rod advancing means 21 and assures the stable transfer of a fuel rod 12a from the rod advancing means 21 onto the unloading table 22. Mechanical controls 24 regulate the loading, feeding and unloading of the fuel rods 12a (FIGS. 1-3).

Figure 1A:
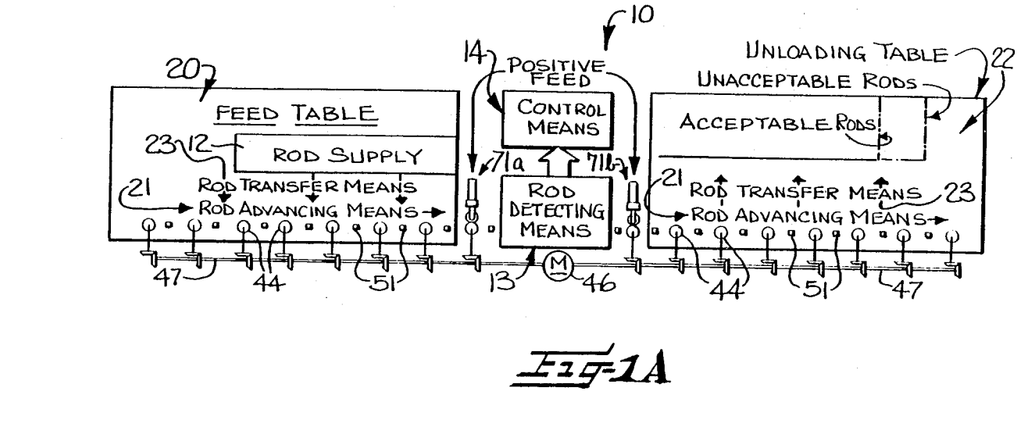
FIG. 1A is a schematic diagram of the apparatus.

FIG. 1A illustrates the apparatus 10 in flow chart methodology. Fuel rods 12 are supplied on the feed table 20 and transferred to the rod advancing means 21. The fuel rod 12 is advanced and its gamma radiation emission count detected at each of a plurality of regularly spaced apart discrete segments of the fuel rod 12. The control means 14 calculates the enrichment value for each segment and the average enrichment of the entire fuel rod 12. If the average enrichment of the fuel rod 12 deviates from a specified enrichment or if the enrichment values of adjacent segments of the fuel rod 12 deviate greater than a specified percentage, then the fuel rod 12 is unacceptable for its intended end use and transferred onto the unloading table 22 at a position varying from the position where the acceptable fuel rods 12 are transferred.

Figure 2:
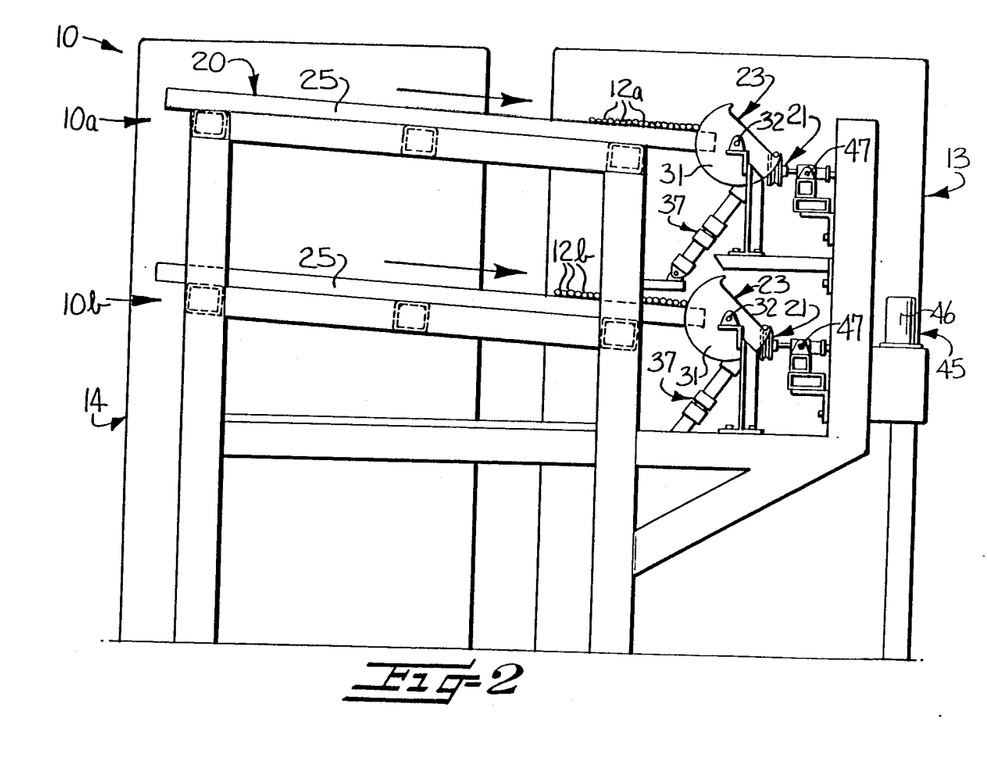
FIG. 2 is an enlarged end view of the apparatus and showing the feed table, rod transferring means, and the rod advancing means
Figure 3:
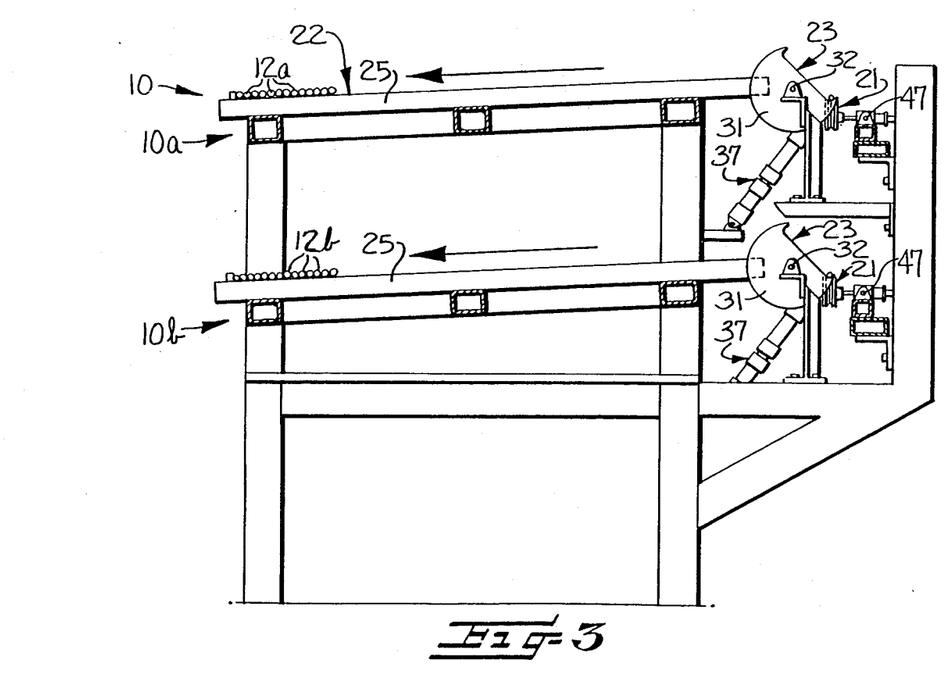
FIG. 3 is an enlarged sectional taken substantially along line 3—3 of FIG. 1 showing the unloading table, rod transferring means, and the rod advancing means.

Referring specifically to FIGS. 1 and 2, the feed table 20 has longitudinally spaced apart opposite ends and laterally spaced apart opposite sides and is fabricated from a series of angled and parallel nylon rails 25 which angle downward in a direction toward the rod transferring means 23. Fuel rods 12 placed onto the rear of the feed table 20 gently roll to a most forward portion and are stopped by an abutment means 26 so as to retain the fuel rods 12 in a side-by-side arrangement along the forward portion of the feed table 20. An operator uses a manually held bar code reader 30 of conventional design to examine each fuel rod 12 which is stored on the feed table 20 for an identifying characteristic unique to each individual fuel rod 12. This information is relayed to the control means 14 where it is stored. Thus, an accurate record is maintained concerning the identity of each fuel rod 12 which has been scanned.

Figure 4:
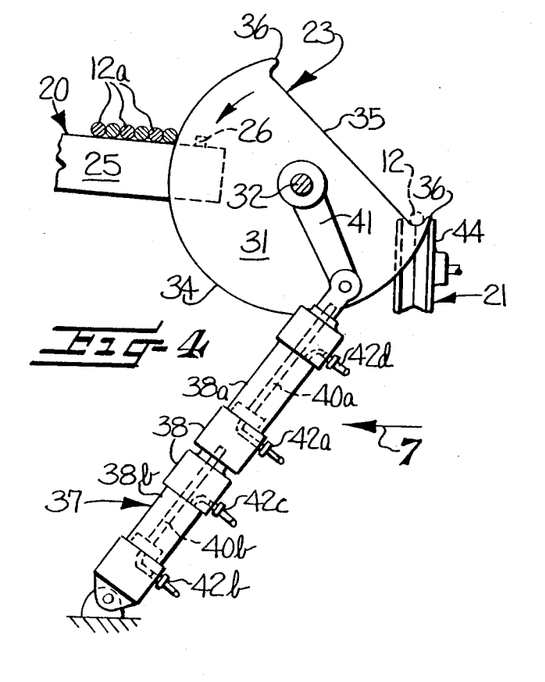
FIG. 4 is an enlarged view of the rod transferring means and illustrating a cam turned so as to transfer a fuel rod from the cam to the rod advancing means.
Figure 5:
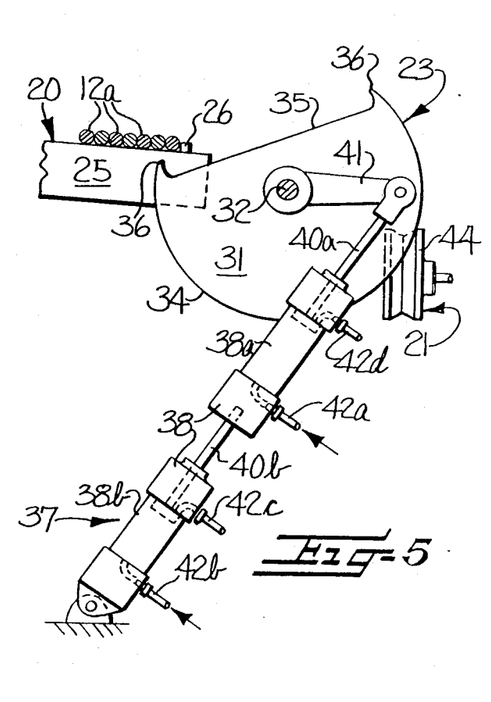
FIG. 5 is an enlarged view similar to FIG. 4 illustrating a cam turned so as to transfer a fuel rod from the feed table to the cam.
Figures 6, 7:
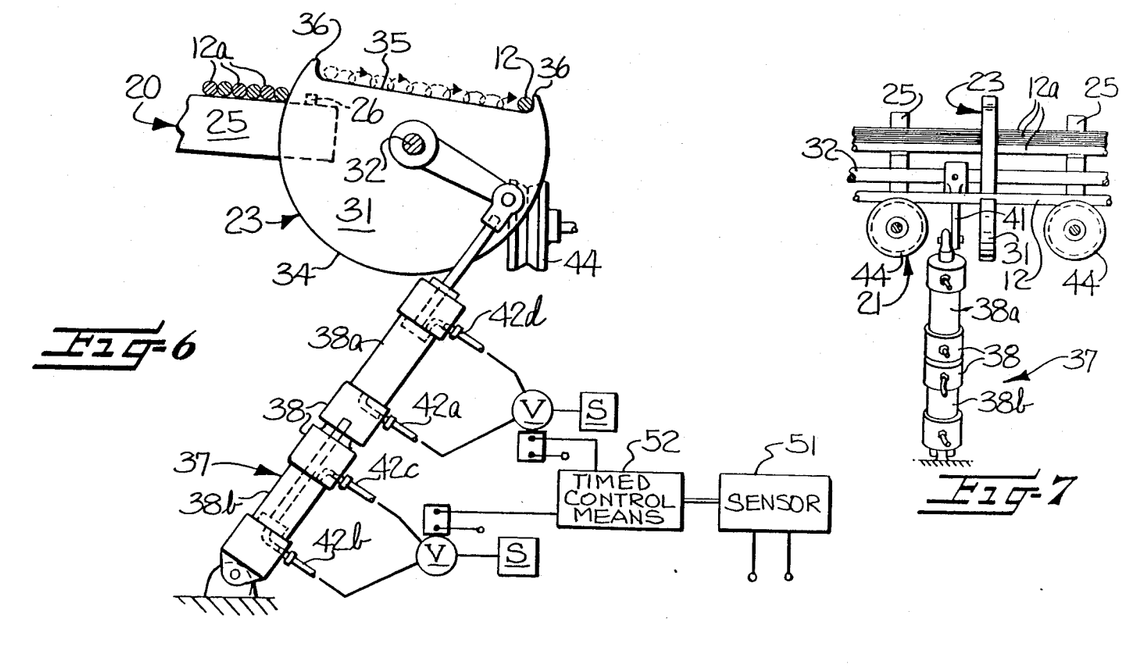
FIG. 6 is an enlarged view similar to FIGS. 4 and 5 illustrating a fuel rod rolling down the straight chordal portion of a cam into a position where the fuel rod may be placed onto the rod advancing means.
FIG. 7 is a view taken along arrow 7 of FIG. 4 showing the rod transferring means and a fuel rod positioned on the rod advancing means.

Fuel rods 12 are transferred one at a time from the feed table 20 to the rod advancing means 21 by the rod transferring means 23. The rod transferring means 23 includes a plurality of longitudinally spaced apart nylon cams 31 fixedly mounted to a central longitudinally extending support rod 32 which is positioned adjacent one side edge of said feed table 20 and said rod advancing means 21. Each cam 31 has a disc-like member having a periphery which includes a circular portion 34 and a straight chordal portion 35 and a raised lip 36 positioned at each juncture of the chordal portion 35 and the circular portion 34 (FIGS. 4–6). Each cam 31 is arranged so that the chordal portions 35 are aligned when viewed axially. The support rod 32 assures that all the cams 31 move together in the same arc when the cams 31 are partially rotated in a semicircular arc between the feed table 20 and the rod advancing means 21. Means 37 for rotating the support rod 32 so that the cams collectively move in a semicircular arc include a split pneumatic cylinder 38 having upper and lower halves 38a and 38b with corresponding pistons 40a and 40b with the uppermost piston 40a connected to cam arm 41.

To load a fuel rod 12 from the feed table 20 to the rod advancing means 21, the pistons 40a and 40b are extended to their farthest position in the pneumatic cylinder 38 by injecting air through fittings 42a and 42b. The piston 40a pushes the cam arm 41 and rotates the support rod 32 which turns the cams 31 so that the chordal portions 35 of the cams 31 are angled downward with the most forward point of the chordal portions 35 at a higher position (FIG. 5). When the cams 31 are in this first position, the fuel rods 12 are free to roll a few more inches down the feed table 20 to the abutment means 26. Air is injected through the fitting 42c to retract the lower piston 40b. The lower piston 40b retracts and the cams 31 begin to rotate in the opposite direction decreasing the negative angle of the chordal portions 35 so that they reach a substantially horizontal point. The cams 31 are so placed and designed so that when the cams 31 reach their most horizontal position, the most rearward raised lips 36 of the cams 31 contact an area disposed between the forward-most fuel rod 12 on the feed table 20 and its most adjacent fuel rod 12. The raised lips 36 separate the two forward-most fuel rods 12 positioned on the feed table 20 and the cams 31 lift the forward-most fuel rod 12 positioned on the feed table 20. As the piston 40b is further retracted, the cams 31 again rotate angling the chordal portions 35 of the cams 31 downward in a forward direction. The fuel rod 12 rolls down the chordal portion 35 of the cams 31 and stops upon engaging the lips 36 at the forwardmost portion of the cams 31 (FIG. 6). Air is injected through the fitting 42d and the uppermost piston 40a retracts and the cams 31 rotate a few more degrees which lowers the fuel rod 12 to a second position directly over the rod advancing means 21. When the piston 40a has retracted to its most withdrawn second position, the fuel rod 12 has been lowered onto the rod advancing means 21 (FIGS. 4 and 7).

Figure 12:
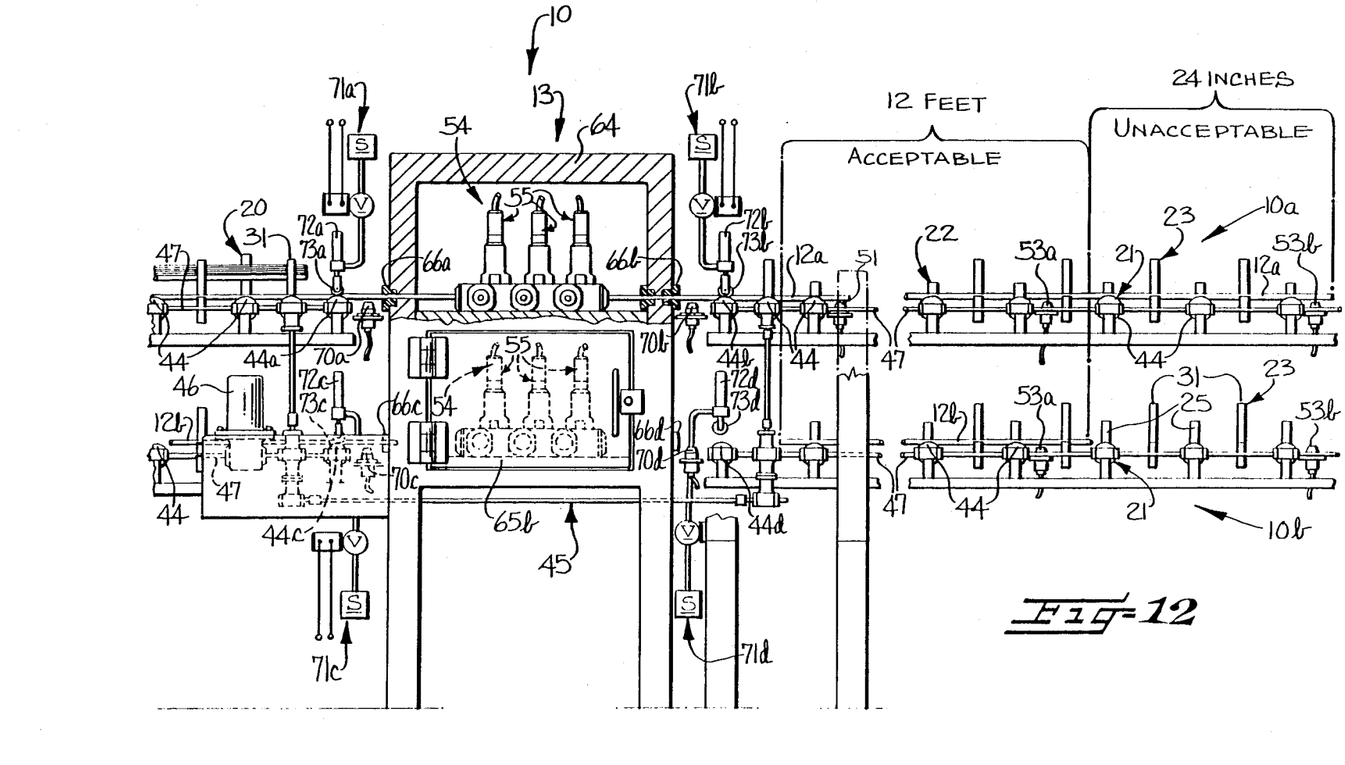
FIG. 12 is a partially sectioned front elevation view of the apparatus showing the detectors positioned inside the radiation shield as well as a fuel rod advancing along the rod transport means and through the detectors.

The rod advancing means 21 is positioned adjacent one side of the feed table 20 and includes a series of linearly aligned and grooved rollers 44 adopted to receive a fuel rod 12 and advance the fuel rod 12 along a linear path of travel. As best seen in FIG. 12, the rod advancing means 21 also includes a positive feed system designated generally at 45 comprising a rod feed motor 46 drive shafts 47 and bevel gear differentials 50. Both the upper and lower systems 10a and 10b are operated from this single rod feed motor 46 by coupling each of the grooved rollers 44 to the motor driven driveshafts 47. Through the driveshaft 47 and gear differential 50 system, each grooved roller 44 is driven at a unitary speed so as to assure that a fuel rod 12 is advanced along a linear path of travel at a constant velocity through the detecting means 13. When the fuel rod 12 has advanced beyond the feed table 20 and through the detecting means 13, the pistons 4a and 40b extend again to their farthest position to begin again the process of loading another fuel rod 12. Sensors 51 and timer control means 52 assure the continued operation and stable transfer of the fuel rods 12 from the feed table 20 onto the rod advancing means 21 (FIGS. 4–6).

Figures 10, 11:
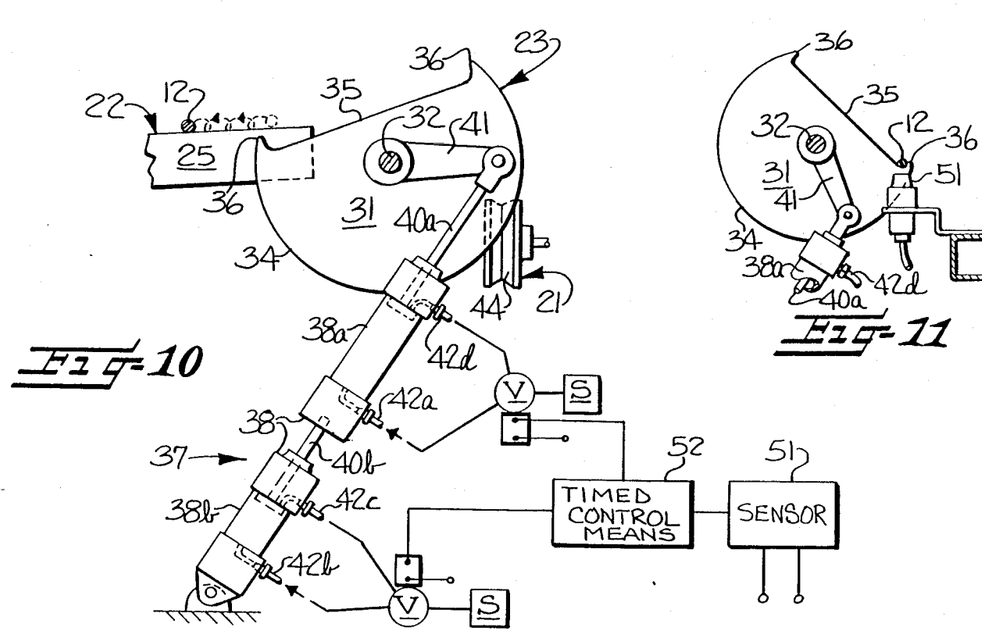
FIG. 10 is a view similar to FIGS. 7 and 8 illustrating a fuel rod rolling down the unloading table after having been transferred to the unloading table from the cam.
FIG. 11 is a view illustrating a sensor used to assist in the rod transferring process.

During the transfer of a fuel rod 12 from the feed table 20 to the rod advancing means 21 one end of the fuel rod 12 may not properly roll across the straight chordal portion 35 of the cam 31. As best seen in FIGS. 1 and 11, the sensors 51 are in spaced apart relation and adjacent the rod advancing means 21. The sensors 51 will detect that one end of the fuel rod 12 has not transferred properly and will generate a signal to the mechanical controls 24 which activates the pneumatic cylinder 38 by a signal means (not shown) stopping the cam 31 rotation. If the sensors 51 detect that the fuel rod 12 has not rolled to a horizontal position, then a signal is again generated to reverse the cam 31 direction so as to bring the fuel rod 12 back to an initial starting point before transfer when it was in a substantially straight and horizontal position. When the sensors 51 detect that the fuel rod 12 is no longer askew, a signal is generated to begin again the transfer (FIGS. 4–6). The timing means 52 incorporated with the mechanical controls 24 maintains a proper speed and timing of the cam 31 rotation so as to assure that a gradual and stable transfer of the fuel rod 12 occurs with minimal difficulty.

Figure 8:
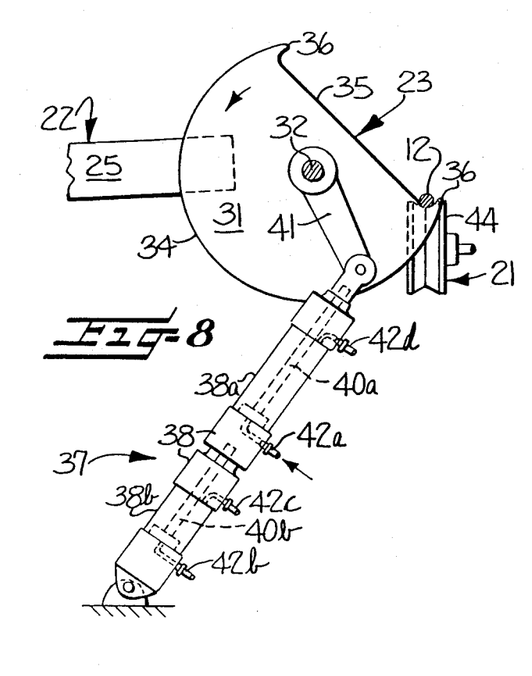
FIG. 8 is an enlarged view of the rod transferring means and illustrating a cam turned so as to transfer a fuel rod from the rod advancing means to the cam.
Figure 9:
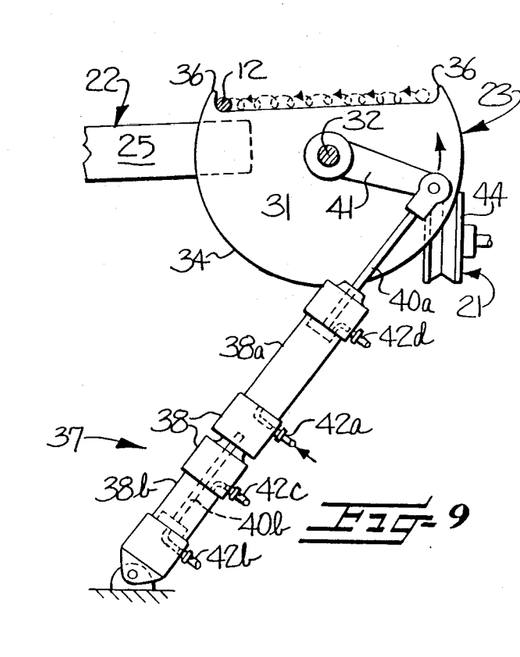
FIG. 9 is an enlarged view similar to FIG. 7 illustrating the fuel rod rolling down the straight chordal portion of the cam to be placed into a position for transfer to the unloading table.

After a fuel rod 12 has been scanned, the fuel rod 12 must be transferred from the rod advancing means 21 to an unloading table 22 which is positioned in longitudinal alignment with said feed table 20 and has a side-to-side inclination opposite that of the feed table 20 (FIG. 3). As seen in FIGS. 8–10, the unloading operation is almost identical to the loading operation except that the cams 31 accept a fuel rod 12 from the rod advancing means 21 and transfer it to the unloading table 22. Also, as in the loading operation, the cams 31 are connected by a central support rod 32 and are rotated in a semicircular arc by the means of a split pneumatic cylinder 38, also having upper and lower halves 38a and 38b, pistons 40a and 40b and cam arm 41. During the initial unloading operation, the pistons 40a and 40b are in their most retracted first position and have have rotated the cams 31 placing the forward-most raised lip 36 of the straight chordal portion 35 at a point below the grooved rollers 44 of the rod advancing means 21. When the uppermost piston 40a extends, the cams 31 rotate and pick up the fuel rod 12 from the grooved rollers 44. As the cams 31 rotate, the fuel rod 12 rolls down the straight chordal portions 35 and stops at the rearmost raised lip 36. When the pistons 40a and 40b have fully extended to a second position, the cams 31 have rotated so that the rear-most raised lip 36 is situated below the unloading table 22 with the result that the fuel rod 12 has been transferred onto the unloading table 22. Because the unloading table 22 is constructed substantially similar to the feed table 20 but is inclined downwardly from the front to the rear as opposed to the inclination of the feed table 20 from rear to the front, transferred fuel rods 12 gently roll down the unloading table 22 to a position at its rear. As in the loading operation sensors 51 and timing control means 52 are used to assure the continued operation and stable transfer of the fuel rods 12 from the rod advancing means 21 onto the unloading table 22.

If a fuel rod 12 has not been accepted because the enrichment value of the fuel rod 12 deviates from a specified enrichment value and/or the enrichment value of adjacent segments of the fuel rod 12 deviate greater than a predetermined percentage, then the unacceptable fuel rods 12 are transferred onto the unloading table 22 at a point varying in position from where the acceptable fuel rods 12 are transferred (FIG. 1). Sensors 53a and 53b are positioned two feet apart on the downstream end of the rod advancing means 21 (FIG. 12). Each of the sensors 53a or 53b can signal the mechanical controls 24 to transfer a scanned fuel rod 12 onto the unloading table 22. The first sensor 53a is positioned approximately 12 feet from the detecting means 13. When the control means 14 determines that a fuel rod 12 is acceptable, the first sensor 53a is activated so that as the advancing acceptable fuel rod 12 reaches the first sensor 53a, the first sensor 53a will signal the mechanical controls 24 to transfer the acceptable fuel rod 12 onto the unloading table 22. If the control means 14 determines that a fuel rod 12 is unacceptable, the second sensor 53b is activated so that as the advancing unacceptable fuel rod 12 reaches the second sensor 53b, the second sensor 53b will signal the mechanical controls 24 to transfer the unacceptable fuel rod 12 onto the unloading table 22. This process repeats itself for each fuel rod 12 while the mechanical controls 24 assure the proper timing and speed of the various operations in accordance with the desired specifications of the apparatus 10.

Figure 13:
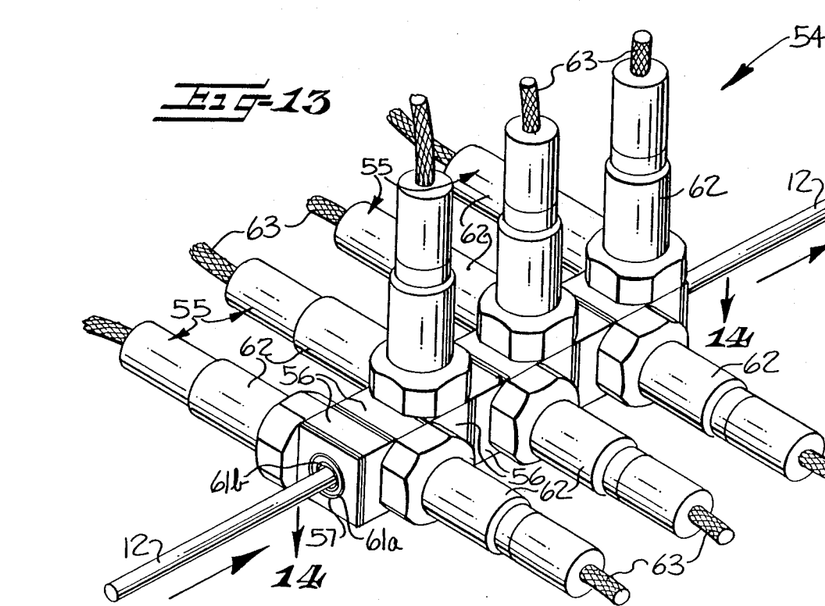
FIG. 13 is a perspective view of the detectors illustrating their geometric configuration and a fuel rod as it is advanced through the detectors.

The detector means 13 includes a detector assembly 54 for mounting ten NaI scintillators (detectors) 55 in a linear side-by-side arrangement. The detectors 55 include a housing 56 and a hole 57 of approximately one inch diameter for admitting the fuel rod 12 so that the fuel rod 12 passes through the hole 57 in the housing centers 56. Means for detecting the 185 KeV gamma radiation emitted by the advancing fuel rod includes an NaI scintillator material (not shown) encompassing the inside periphery of each hole 57. The detectors 55 are integral one with another in a cascaded arrangement with each hole 57 in line with the holes 57 in adjacent detctors 55 so that a transverse opening extends throughout the integrally arranged detectors 55. Thus, a fuel rod 12 may be advanced unopposed through the detector holes 57 (FIGS. 12 and 13).

Figure 14:
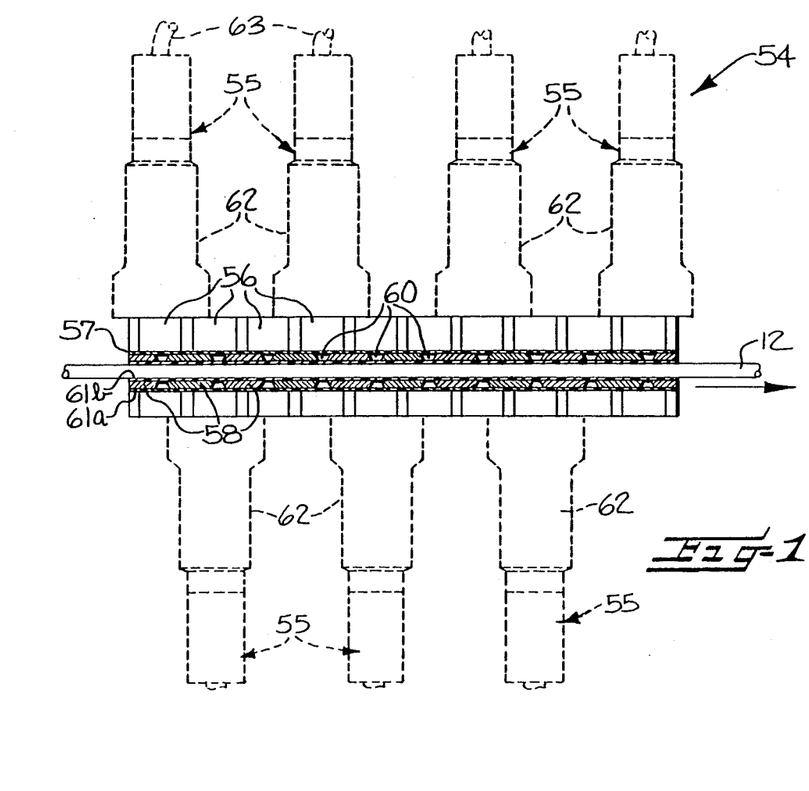
FIG. 14 is a sectional view taken substantially along line 14—14 of FIG. 13 showing tubular sleeve segments internal to the detectors which are used for collimating the gamma radiation to the detectors.

The hole 57 in each detector 55 is somewhat larger in diameter than the fuel rod 12 diameter in order to allow a series of lead tubular sleeve segments 58 to be placed coaxially within the transverse opening defined by the holes 57 of each detector 55. These sleeve segments 58 act as a collimating means for limiting the radiation received by each detector 55 to a predetermined segment of the nuclear fuel rod 12 passing through each hole 57. Each lead sleeve segment 58 is spaced approximately ¼" apart so as to define annular windows 60 for collimating to each detector 55 the gamma radiation emitted by a fuel rod 12 as it is advanced through the detectors 55 (FIG. 14). Each lead sleeve segment 58 is approximately 1 ⅝" long and has an outside diameter slightly less than the hole diameter and an inside diameter slightly greater than the fuel rod diameter. Two nylon sleeves 61a and 61b of approximately 30 mil wall thickness extend throughout the transverse opening defined by the detector holes 57. One of the nylon sleeves 61a is interposed between the lead sleeve segments 58 and the scintillator material so as to protect the scintillator material from scratches and other damage. The other nylon sleeve 61b is smaller in diameter and secured to the inside periphery of the lead sleeve segments 58 so as to form a protective layer which protects the fuel rod 12 from damage as it passes through each detector hole 57 and to lessen the internal friction in order to permit the easier passage of the fuel rod 12 through each hole 57.

As a fuel rod 12 is advanced through the detectors 55, gamma radiation emitted from the advancing fuel rod 12 is collimated through the annular windows 60 to the scintillator material. The gamma radiation produces light impulses (photons) on the scinillator material which are transferred to the photomultiplier tube 62 converting the pulses into electrical signals which are amplified and transmitted by leads 63 to electronic counting and recording apparatus, all part of the control means 14. The 185 KeV gamma radiation from $U^{235}$ is counted for each regularly spaced apart discrete segment of the fuel rod 12. The detectors 55 are synchronized in time to count the gamma radiation emission count for each segment. Thus, the same segment of the fuel rod 12 is scanned by each detector 55. In order to initially synchronize and time the detectors 55 in relation to the velocity of the advancing fuel rod 12, a high accuracy, high resolution clock (not shown) giving 64,000 ticks a second is employed.

Each detected segment of the fuel rod 12 is approximately one-fourth inch long and the spacing between the segments is minimal or nonexistent. Because there is always some error in a precisely timed mechanical apparatus, there will be some overlap between adjacent segments. However, the contribution of the gamma radiation emitted by an adjacent segment is negligible since the lead sleeve segments 58 used to collimate the gamma radiation are precisely spaced and the total counts obtained by the ten detectors 55 for each segment also minimize the error attributed by the readings obtained from the possible overlap of adjacent segments.

The counts obtained for each segment are summed by the control means 14 and the total 185 KeV $U^{235}$ count obtained. This is generally on the order of about 3,200 counts and from that count, the enrichment of each segment and an average enrichment for the fuel rod 12 is calculated. If the average enrichment for the fuel rod 12 deviates from a specified enrichment the fuel rod will be unacceptable for its intended use and the control means 14 will activate sensor 53b which generates a signal to the mechanical controls 24. The mechanical controls 24 permit the unacceptable fuel rod 15 to advance a greater distance along the rod advancing means 21 (FIGS. 1 and 10). Thus, when the unacceptable fuel rod 12 is transferred to the unload table 22, acceptable fuel rods 12 will be separated from unacceptable fuel rods 12. There is an additional criterion used to prevent false rejects because of the natural variation of the counts for each segment. For a fuel rod 12 to be considered as unacceptable, the segment immediately adjacent to the one deviating by over 7.5% must itself deviate by at least 5%. Since each segment measured is approximately one-fourth inch long, a bad pellet should show a deviation over two successive segments since a pellet is one-half inch long.

To prevent outside radiation influences from interfering with the fuel rod detecting, a radiation shield 64 encloses completely the detectors 55. (FIGS. 1 and 12). The shield 64 has two sets of doors 65a and 65b providing ready access to the upper and lower group of detectors 55 of the apparatus 10. Fuel rods 12a and 12b enter and exit the shield 63 through orifices 66a, 66b, 66c and 66d.

To assure that the advancing fuel rods 12a and 12b have an adequate drive to maintain sufficient force entering and exiting the radiation shield 64, sensors 70a, 70b, 70c and 70d situated close to each orifice 66a-d signal pressure means 71a, 71b, 71c and 71d overlying the grooved rollers 44a, 44b, 44c and 44d (positive feed rolls) to apply pressure onto the fuel rods 12a and 12b. Pressure means 71a-d consists of pneumatic cylinders 72a, 72b, 72c and 72d and pressure rolls 73a, 73b, 73c and 73d which extend downward onto the fuel rods 12a and 12b advancing along each positive feed roll 44a-d. In operation, when the advancing fuel rod 12a reaches the sensor 70a near orifice 66a, a signal is generated to the pneumatic cylinder 72a to extend the pressure roll 73a downward onto the fuel rod 12a. The additional pressure exerted by the pressure roll 73a onto the fuel rod 12a prevents slippage of the fuel rod 12a on the positive feed roll 44a thereby assuring an unopposed and constant advance of the fuel rod 12a through the radiation shield 64 and the detectors 55. Upon exiting the radiation shield 64, the fuel rod 12a advances past the sensor 70b onto the positive feed roll 44b. After a timed delay the sensor 70b near orifice 66b signals the pneumatic cylinder 72b of pressure means 71b to extend the pressure roll 73b downward onto the fuel rod 12a. The additional pressure exerted onto the fuel rod 12a and the positive feed roll 44b assures that the fuel rod 12a will have a sufficient driving force imparted by the positive feed roll 44b so as to advance the fuel rod 12a along the rod advancing means 21. It is to be understood that the lower system 10b of the apparatus 10 operates in a manner substantially similar to that of the upper system 10a.

To calibrate the entire system, a reference fuel rod (not shown) having known values of high, medium and low enrichments along its length is advanced through the detectors 55 and a gamma radiation emission count to enrichment calibration curve is established. This data is recorded in the control means 14 to use as a reference for a fuel rod 12 having an unknown enrichment.

It will be understood that the specification and examples are illustrative but not limiting of the present invention, and that other embodiments within the spirit and scope of the invention will suggest themselves to those skilled in the art.

That which is claimed is:

1. A method for passively scanning the gamma radiation emission count of nuclear fuel contained within a fuel rod to determine enrichment uniformity comprising the steps of:
   (a) advancing a fuel rod along a linear path of travel;
   (b) repeatedly detecting the natural gamma radiation emission count of the advancing rod at each of a plurality of regularly spaced apart discrete segments along the length of the advancing rod; and
   (c) summing the output of each of the detecting steps for each segment to obtain a total gamma radiation emission count for each segment.

2. A method as claimed in claim 1 including the step of calculating from the total gamma radiation emission count for each segment the enrichment value for each segment and the average enrichment value for said fuel rod.

3. A method as claimed in claim 2 including the step of monitoring the average enrichment value of the fuel rod for deviations from a specified enrichment value, and/or for deviations in the enrichment values of adjacent segments of said fuel rod greater than a predetermined percentage.

4. An apparatus for passively scanning the gamma radiation emission count of nuclear fuel contained within a nuclear fuel rod to determine enrichment uniformity comprising:
   (a) means for advancing a fuel rod along a linear path of travel;
   (b) means positioned along the path of travel for repeatedly detecting the natural gamma radiation emission count at each of a plurality of regularly spaced apart discrete segments along the length of said fuel rod as said fuel rod advances along said linear path of travel; and
   (c) means for summing the gamma radiation count for each segment to obtain a total gamma radiation emission count for each segment.

5. The apparatus as claimed in claim 4 including calculating means for determining the enrichment value for each of said segments from the total count for each segment and the average enrichment value for said fuel rod.

6. The apparatus as set forth in claim 4 wherein said means for repeatedly detecting the gamma radiation emission count of the advancing fuel rod includes a plurality of linearly aligned detectors, with each of said detectors including means for detecting gamma radiation of a predetermined energy level.

7. The apparatus as set forth in claim 6 wherein each detector has a hole extending through said detector for receiving and encompassing the periphery of said fuel rod and including tubular sleeve segment means positioned within each detector hole for defining an annular window within each detector hole for collimating the gamma radiation from said fuel rod to each detector.

8. The apparatus as set forth in claim 6 including means enclosing said detectors for shielding said detectors from outside radiation sources.

9. The apparatus as defined in claim 4 further comprising
   a feed table positioned adjacent said rod advancing means, with said feed table being adapted to a plurality of rods in a side-by-side arrangement;
   means for individually transferring the rods from said feed table onto said rod advancing means.

10. The apparatus as defined in claim 9 further comprising
    an unloading table positioned adjacent said rod advancing means, with said detecting means being positioned between said feed table and said unloading table, and
    means for individually transferring the rods from said rod advancing means onto said unloading table.

11. An apparatus for passively scanning the gamma radiation emission count of nuclear fuel contained in a nuclear fuel rod to determine enrichment uniformity, and comprising
    a plurality of detectors, with each of said detectors comprising
    (a) a housing including a hole for admitting a nuclear fuel rod therethrough,
    (b) means mounted in said housing for detecting gamma radiation of a predetermined energy level in a fuel rod extending through said hole,
    means mounting said detectors in a linear side-by-side arrangement and with said holes being linearly aligned so as to permit a fuel rod to be advanced through the aligned hole, and
    control means operatively connected to each of said detectors for recording the count of the detectors in shifted time intervals corresponding to the passage of a given segment of a fuel rod being continuously advanced through said holes of said detectors, and for adding the counts for each such segment of said fuel rod.

12. The apparatus as defined in claim 11 wherein said collimating means of each of said detectors comprises a pair of spaced apart sleeve segments positioned coaxially in the associated hole, and with said sleeve segments being composed of a material adapted to block the passage of gamma radiation, and with said sleeve segments being linearly spaced apart to define a narrow window for the passage of gamma radiation to said detecting means.

* * * * *